June 9, 1925.  
F. W. HILLARD  
TYPEWRITING MACHINE  
Filed June 29, 1923  2 Sheets-Sheet 1

1,541,498

Inventor  
Frederic W. Hillard

June 9, 1925.  1,541,498
F. W. HILLARD
TYPEWRITING MACHINE
Filed June 29, 1923    2 Sheets-Sheet 2
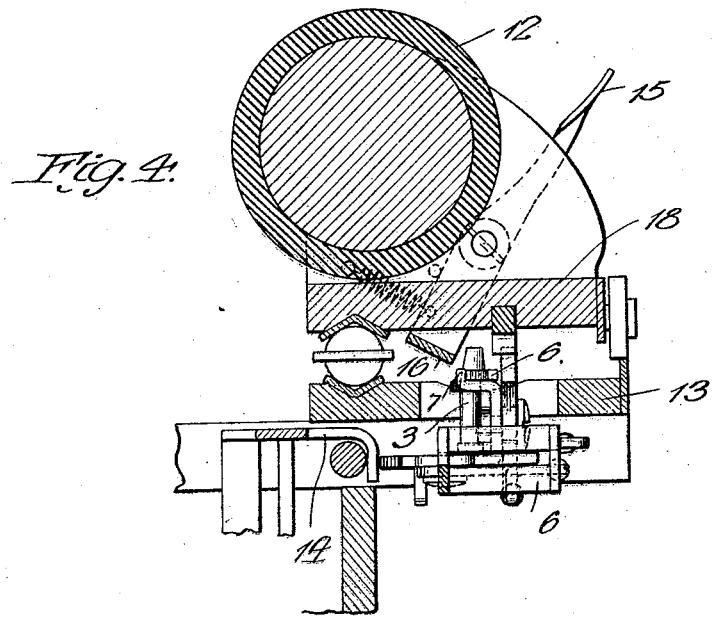
Fig. 4.
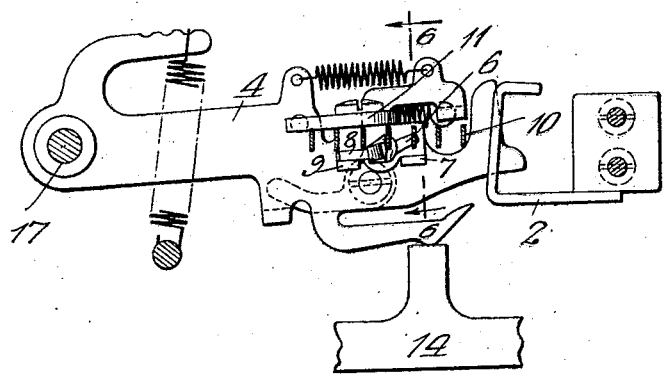
Fig. 5.
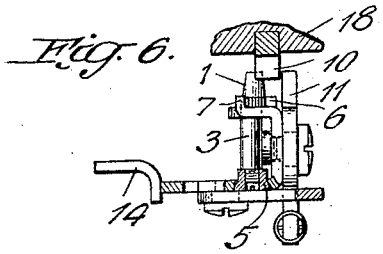
Fig. 6.
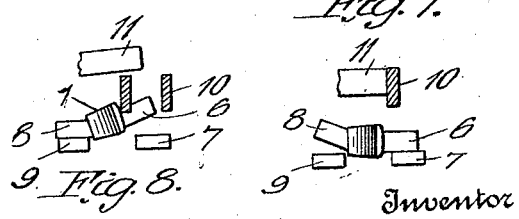
Fig. 7.
Fig. 8.
Inventor
Frederick W. Hillard Patented June 9, 1925.

1,541,498

UNITED STATES PATENT OFFICE.

FREDERIC W. HILLARD, OF TOTTENVILLE, NEW YORK.

TYPEWRITING MACHINE.

Application filed June 29, 1923. Serial No. 648,506.

*To all whom it may concern:*

Be it known that I, FREDERIC W. HILLARD, a citizen of the United States, residing at Tottenville, in the county of Richmond and State of New York, have invented certain new and useful Improvements in Typewriting Machines, of which the following is a full, clear, and exact description.

My invention relates to an improved escapement for typewriters.

In one aspect it relates to an escapement wherein means are provided in the letter spacing operations for disengaging the normally engaged dog from the rack and engaging the normally disengaged dog therewith, and also wherein means are provided for swinging both dogs farther and entirely through and clear of the rack when it is desired to release the carriage from the escapement. I have provided such an escapement with a perpendicularly pivoted rotary or obliquely swivelling normally disengaged dog, which is adapted to be swivelled on its pivot into an inclined position when it is moved into engagement with the rack, whereby the feed of the carriage may be started immediately after the printing and whereby the force of the carriage main spring may be utilized to effect the restoration of the moving parts toward their normal positions, etc.; and I have positioned the said pivot on the dog carrying arm at the end of the normally disengaged dog which is farthest from the normally engaged dog.

The purpose of such positioning is to enable the normally disengaged dog to re-enter the rack properly by re-entering at its pivotal end, after the carriage has been released from the escapement, as above described, regardless of which position, whether inclined or uninclined, the dog may be in at the commencement of the return movement. Since the pivotal end of the dog is thus the first portion thereof to re-enter the rack, upon the return movement after the release of the carriage from the escapement, if the dog should then be in its inclined position on its pivot, it will, as it re-enters be freely swivelled back into its uninclined position by the rack teeth, as it passes into and through the rack, between the teeth, back to normal position. This will be hereinafter more fully described.

In another respect my invention relates to an escapement wherein the dog carrying rocker arm is pivotally mounted on a fixed pivot perpendicular to the line of feed of the engaged rack tooth, so that the rocker arm will lie in a plane parallel with and in close proximity to the said line of feed, and will vibrate therein in the letter spacing movements, to successively engage and disengage each of the dogs with the rack; and in providing on such rocker arm a normally disengaged dog having its holding face inclined to said line of feed when the dog is engaged with the rack, whereby the pull of the main spring may be the better utilized through the carriage and rack upon the rocker arm in the starting back of the moving parts, etc., upon the release of the depressed type key, as will also be hereinafter more fully described.

I have herein shown my invention as applied to the folding carriage Corona typewriter, but I do not intend to limit the invention to that type of typewriter since the invention is of broader application and may be applied to any typewriting machine. In the drawings which form a portion of this specification:—

Fig. 4 is a cross section on the line 4—4 of Fig. 1, looking in the direction of the arrows.

Fig. 5 is a diagrammatic plan view of the escapement mechanism in the changed position, that is, in the one where the loose dog has been withdrawn and the rotary dog engaged with the rack.

Fig. 6 shows the dogs in the same position as Fig. 5 on line 6—6 of Fig. 5.

Figs. 7 and 8 are enlarged diagrammatic views of the rotary dog and escapement teeth, Fig. 7 showing the rotary dog in the straight line position and Fig. 8 in the inclined position.

Figure 1:
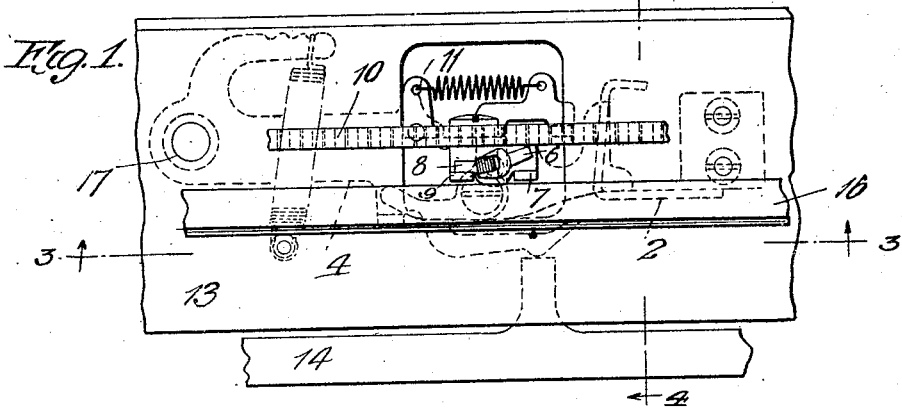
Figure 1 is a plan view of the Corona typewriter with the mechanism in normal writing position, with the carriage removed and the carriage rack shown above the bed plate; and the escapement dogs mounted on the bed plate intermediate the plate and the rack.
Figure 2:
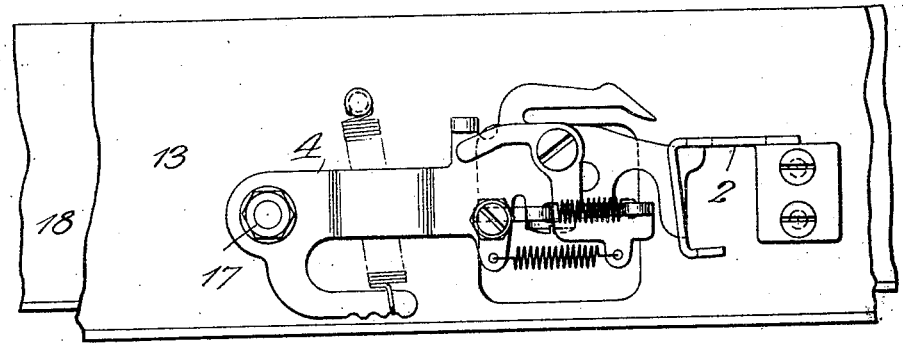
Fig. 2 is a reversed view of the escapement mechanism, that is to say, a view looking down upon the machine after the carriage has been turned over for transportation.
Figure 3:
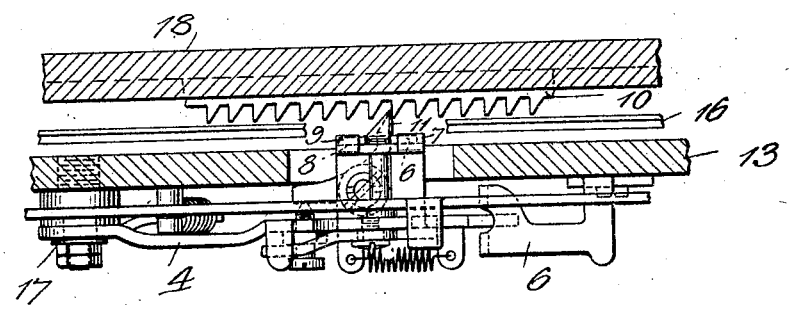
Fig. 3 is a cross section on line 3—3 of Fig. 1, looking in the direction of the arrows on Fig. 1.

All the mechanism shown in the drawings is precisely the same as in the Corona typewriter as regularly made excepting that a rotary or obliquely swivelling dog 1, mounted on a pivot perpendicular to the line of feed of the engaged rack tooth, has been substituted in place of the usual rigid holding dog which latter in the regular Corona construction forms an integral part of the escapement rocker arm 4, and that the new escapement arm for the rotary dog has been so formed that when it is punched out and bent up it forms a housing 2 for the shaft 3 of the rotary dog. The rotary dog shaft 3 passes through holes in the upper housing and in the base thereof in the rocker arm 4 and at its upper end the shaft is provided with the rotary dog 1 while at its lower end it is held in place by a rotary dog nut 5.

Upon the top of the housing two stops 7 and 9 are bent up when the housing is bent and these stops constitute stop pieces to limit the throw of the rotary dog from an unbevelled or uninclined position to a bevelled or inclined one. The rotary dog is formed with two stop arms 6 and 8 for engagement with the two stop pieces 7 and 9 as above referred to. The dog arm 6 engages with the stop piece 7 to limit the throw of the dog into its uninclined position relatively to the rack feed, making preferably just sufficient "drop" relatively to the spacing dog 11 as is necessary to insure the free entry of the rotary dog into the rack when a key is depressed. The stop arm 8 is so positioned relatively to the housing stop piece 9 as to permit the rotary dog to rotate into the desired inclined position, as say 10° or 15° or 20°, etc., to cause it to function the same as what is known as a bevelled rigid dog does.

The function of the bevelled rigid dog as ordinarily employed in many typewriters is to hold the carriage from spacing until after the printing and then to permit the carriage feed to begin as soon as the depressed key is released and while the rigid dog is being disengaged from the rack, and if such dog be bevelled to a considerable extent, as say 10° to 20°, etc., the pull of the main spring on the rack will act thereon as on an inclined plane tending to throw the rigid dog out of the rack and to re-engage the spacing dog 11. The present rotary or obliquely swivelling dog 1 when swung into its rotated position performs the same function as a bevelled rigid dog, namely, to permit the carriage feed to begin as soon as the depressed key is released and "to repulse" the rotary dog out of the rack and to whip back the connected type bars away from the printing cylinder 12 so as to avoid collisions in rapid operation and to start upwardly the depressed keys, giving the well known staccato blow, all by aid of the main spring.

The reason why I use the obliquely swivelling dog 1 in the present case, instead of a bevelled dog, is that in order to release the carriage from the escapement the swivelling dog is swung completely through the rack from one side of the rack to the other along with the spacing dog. In the folding Corona typewriters, where the carriage is folded forward for transportation the machine is made so compact that no room is allowed for lifting the rack up above the dogs or for lowering the dogs down out of the way of the rack.

The folding carriage of the Corona typewriter has just room to slip the dog carrier 4 horizontally in between the bed plate 13 and the rack 10 with the two dogs reaching up into the rack and the dogs can not be lowered down out of the rack or the rack lifted up off from the dogs to free the carriage from the escapement. Hence both the dogs have to be moved entirely through the rack to release the carriage from the escapement, as above described. This is the ordinary structure of the Corona folding carriage machine, in which the dogs are operated by the bale 14 driven by key lever and their connections when the carriage is in the normal writing position, this structure being so well known that I have deemed it unecessary to show the key levers. It is thus impossible, as above stated, to use a bevelled rigid repulsion dog in such structure because such bevelled rigid dog, being on a substantially inclined plane, takes up so much room that it cannot go through between the rack teeth.

Since it is thus impossible to drive the rigid dog, when provided with a substantially beveled holding face through the rack to release the carriage from the escapement, I have devised my improved swivelling or rotary dog, which is so designed that it will be swung into the inclined position during printing operations, and will swing back into its uninclined position so that it can pass through the rack with the spacing dog, whenever it is desired to release the carriage from the escapement, or to return the dogs in the reverse direction through the rack thereafter. The novel means by which I effect this function is to pivot the rotary or swivelling dog upon its shaft 3 substantially at the end farthest removed from the spacing dog 11. Thus whenever a key is depressed and the spacing dog withdrawn from the rack in typing, the rotary dog will be swung into its inclined position, because the swinging part of the dog is the end facing the spacing dog. I have not shown a spacing spring for swivelling the rotary dog back into its uninclined position after the printing because such spring is not necessary and I have wished to show the simplest form. But of course any of the springs which are well known to the art for that purpose, may be employed if desired.

The method of swinging the dogs through the rack to release the carriage from the escapement, with the ordinary unbevelled dogs of the Corona, is to swing the release key 15 forwardly thus forcing the release bale 16 rearwardly against the front edge of the rigid dog. With my rotary dog the operation is precisely the same, that is, the release bale strikes against the forward edge (or the edge farthest removed from the spacing dog) and thus swings both dogs rearwardly through the rack, or the bale strikes the front faces of the housing stop pieces 7 and 9 or either of them to perform the function or jointly strikes the housing stops 7 and 9 and the rotary dog 1 since the bale swings downwardly and rearwardly in the releasing movement. It is immaterial whether the release bale strikes the dog or the stops or both.

In the operation of the device for typewriting, upon depression of either of the key levers, the rocker arm 4 will be vibrated rearwardly about its perpendicular pivot 17, in a plane substantially parallel with and in close proximity to the line of feed of the engaged rack tooth. This is literally true of the straight rack shown in the drawings, and it will also be substantially true if a rotary rack or escapement wheel is used.

The rearward vibration of the rocker 4, serves to disengage the spacing dog 11 from the rack and to engage the rotary dog 1 therewith. As soon as the spacing dog has been disengaged from the rack, the vibratory dog will be swivelled into its inclined position on the rocker arm, by the force of the main spring, acting through the carriage and rack upon the dog, and will then perform all of the functions of the well known bevel rigid repulsion dog, as is well known to the art.

The present escapement is, however, an improvement over prior repulsion dog escapements, in that in the present case the rocker arm is pivoted on a rigidly fixed perpendicular pivot in close proximity to the line of the rack feed, so that the pull of the main spring on the rack is directly taken up and overcome longitudinally of the rocker arm, by the perpendicular, rigidly fixed pivot 17, without detracting from the repulsive effect of the dog on the moving parts, by any springing, yielding or recoil of the rocker arm itself. I have found, in practice, that the application of the repulsive dog in the present manner, greatly improves the key action and the speed and smoothness of the carriage feed, over prior repulsion escapements, wherein the arrangement was reversed, i. e.—wherein the rocker arm was mounted perpendicularly and its pivotal point arranged horizontally relatively to the line of the rack feed, and distant therefrom by the length of the rocker arm.

I believe myself to be the first to have invented an escapement wherein the dog carrying rocker arm is pivoted on a rigidly fixed pivot, perpendicular to the line of feed of the engaged rack tooth and in close proximity thereto, and is provided with a normally disengaged dog adapted, when engaged with the rack, to start back the moving parts toward their normal positions through the force of the main spring acting on said dog, the combination being such that the repulsive force of the blow on the dog is directly taken up by said pivot to which it is transmitted longitudinally of the rocker arm, in the line of the rack feed, whereby all yielding of the rocker arm to the repulsive blow on the dog is prevented, thus effecting a stronger repulsion of the moving parts, as well as quickening the carriage feed and making it smoother. This, as it lessens jar and vibration in the feeding movement of the carriage, not only makes the feed quicker and smoother, but it also materially reduces noise in the typewriter and correspondingly improves the key action.

Hence I shall broadly claim such combination herein. Also more specifically, such locating of the rocker arm and its pivotal point, in combination with the perpendicularly pivoted obliquely swivelling holding dog on the rocker; and the latter combination with the means for releasing the carriage from the escapement, as above described. On the return movement the rotary dog freely re-enters the rack tooth because the forward end of the dog is preferably substantially at the pivot shaft and therefore in line with the loose dog, no matter whether the rear working end of the dog is in its straight line position or in its inclined position.

The special preferred feature of the invention is that the pivotal point of the rotary dog be substantially at the end of the dog farthest removed from the spacing dog. The angle of inclination of the dog may be widely varied at the option of the maker as say 10° or 15° or 20°, all of which angles give a repulsive action but increasing with the increased inclination of the dog. I do not at all limit myself as to the particular degree of inclination, nor do I limit myself in the broad claims to the particular location of the pivot shaft 3 of the rotary dog, but it is best and most desirable to pivot the rotary dog at or near the end of the dog farthest removed from the spacing dog, for the reasons above stated.

By the term rack as used herein I intend to include what is known as a straight rack or a rotary rack or escapement wheel,—i. e., I use the term "rack" in its broad generic sense. I have also, herein, employed the term "the line of the rack feed". By this and other similar terms I mean the direction of feed of the engaged rack tooth. In the straight rack, as shown in the drawings, all of the rack teeth, of course, feed in the same straight line. If, however, the rotary rack or escapement wheel be employed, the movement of the teeth will, of course, be in a circle,—the periphery of the escapement wheel. However, the engaged tooth, in the short movement while in its engagement with the dog, will move in an approximately straight line,—i. e., in either straight rack or escapement wheel.

Having thus described my invention, what I claim and desire to secure by Letters Patent is as follows:

1. In a typewriter, the combination with the carriage and the main spring, of an escapement comprising a rack and a vibratory dog rocker, a normally engaged uninclined dog thereon and a normally disengaged dog on the rocker having its holding face, when engaged with the rack, inclined to the line of the rack feed, said rocker being pivoted on a rigidly fixed pivot positioned in close proximity to said line of feed and perpendicular thereto, whereby the force of the main spring acting on the inclined faced dog to disengage it from the rack, will be transmitted longitudinally through said rocker to said perpendicular pivot, substantially as described.

2. In a typewriter, the combination with the carriage and the main spring, of an escapement comprising a rack and a dog carrying rocker, a normally engaged dog on the rocker and a normally disengaged dog thereon having its holding face, when engaged with the rack, inclined to the line of the rack feed, said rocker being pivoted on a rigidly fixed pivot positioned in close proximity to said line of feed and perpendicular thereto, and said normally disengaged dog being pivoted on said rocker on a pivot perpendicular to the line of the rack feed.

3. In a typewriter, the combination with the carriage and the main spring, of an escapement comprising a rack and a dog carrying rocker, a normally engaged dog on the rocker and a normally disengaged dog thereon having its holding face, when engaged with the rack, inclined to the line of the rack feed, said rocker being pivoted on a rigidly fixed pivot positioned in close proximity to said line of feed and perpendicular thereto, and said normally disengaged dog being pivoted on said rocker on a pivot perpendicular to the line of the rack feed and at the end of the dog farthest removed from the normally engaged dog.

4. In a typewriter, the combination with the carriage and the main spring, of an escapement comprising a rack and a dog carrying rocker, a normally engaged dog on the rocker and a normally disengaged obliquely swivelling dog, said rocker being pivoted on a rigidly fixed pivot positioned in close proximity to the line of the rack feed and perpendicular thereto, and said swivelling dog being pivoted on the rocker on a pivot perpendicular to the line of the rack feed and at the end of the dog farthest removed from the normally engaged dog, means for operating the rocker for typewriting and a carriage release key and means operated thereby for swinging the rocker through a greater range to move both dogs through and entirely clear of the rack, whereby upon the return movement after said release of the carriage, the pivoted end of the swivelling dog will first reenter the rack, substantially as described.

5. In a typewriter escapement, the combination with the carriage and the main spring, of a rack member, a dog member engaging therewith and comprising an escapement rocker having a normally engaged dog and a normally disengaged holding dog, said normally engaged dog having its holding face uninclined and the normally disengaged dog, when engaged with the rack, having its holding face inclined to the line of the rack feed so that the moving parts will be started back to normal position by aid of the main spring, and a rigidly fixed pivot perpendicular to said line of feed and in close proximity thereto and on which the escapement rocker is vibratorily mounted in parallelism to said line of feed, whereby the repulsive thrust of the main spring on said inclined faced dog acting to start back the moving parts, will be transmitted longitudinally of the escapement rocker to said perpendicular pivot.

6. In a typewriter escapement, the combination with the carriage and main spring, of a rack member, a dog member engaging therewith and comprising a rocker arm, a normally engaged dog and a normally disengaged holding dog thereon, said holding dog being pivotally mounted on the rocker arm on a pivot perpendicular to the line of feed of the rack tooth which it is to engage and adapted, when so engaged, to be rotated into a position inclined to said line of feed, stop means on the rocker arm to limit the rotation of said holding dog thereon, and a perpendicular pivot on which the rocker arm is vibratorily mounted in close proximity to said line of feed and in parallelism therewith.

7. In a typewriter escapement, the combination with the carriage and the main spring, of a rack member and a dog member engaging therewith and comprising a rocker arm having a normally engaged dog thereon and a normally disengaged rotary holding dog perpendicularly pivoted on said arm, substantially at the end of the dog farthest from said normally engaged dog, said holding dog having a limited swivelling movement on its pivot into and out of a position inclined to the line of feed of the engaged rack tooth, means for swinging the rocker arm to alternately engage and disengage the dogs with the rack, and a release key and means operated thereby for swinging the rocker arm still farther to disengage both dogs from the rack, the construction and operation being such that upon the return movement, after said release, the said holding dog will properly re-enter the rack at its said pivotal end, regardless of whether it then be in its said inclined or its uninclined position on the rocker arm.

FREDERIC W. HILLARD.